United States Patent
Kauffman et al.

(10) Patent No.: US 7,050,943 B2
(45) Date of Patent: May 23, 2006

(54) SYSTEM AND METHOD FOR PROCESSING OPERATION DATA OBTAINED FROM TURBINE OPERATIONS

(75) Inventors: Eric J. Kauffman, Marietta, GA (US); Richard J. Rucigay, Saratoga Springs, NY (US); Troy P. Christensen, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 942 days.

(21) Appl. No.: 09/996,799

(22) Filed: Nov. 30, 2001

(65) Prior Publication Data

US 2003/0105544 A1    Jun. 5, 2003

(51) Int. Cl.
 *G06F 19/00*  (2006.01)
(52) U.S. Cl. ............... 702/188; 702/182; 702/183; 702/184; 700/287; 340/635
(58) Field of Classification Search ............... None
 See application file for complete search history.

(56) References Cited

U.S. PATENT DOCUMENTS

| | | | |
|---|---|---|---|
| 3,731,070 A | 5/1973 | Urban | |
| 3,937,934 A | 2/1976 | Pasemann | |
| 4,215,412 A | 7/1980 | Bernier et al. | |
| 4,621,335 A | 11/1986 | Bluish et al. | |
| 4,785,403 A | 11/1988 | Kuhlberg | |
| 4,992,946 A | 2/1991 | Butz et al. | |
| 5,067,099 A | 11/1991 | McCown et al. | |
| 5,249,260 A | 9/1993 | Nigawara et al. | |
| 5,311,422 A | 5/1994 | Loftin et al. | |
| 5,532,941 A | 7/1996 | Lin | |
| 5,748,500 A | 5/1998 | Quentin et al. | |
| 5,886,895 A * | 3/1999 | Kita et al. | 700/28 |
| 5,900,555 A * | 5/1999 | Westphal et al. | 73/766 |
| 6,138,081 A | 10/2000 | Olejack et al. | |
| 6,157,310 A | 12/2000 | Milne et al. | |
| 6,230,495 B1 * | 5/2001 | Benesch et al. | 60/660 |
| 6,262,550 B1 | 7/2001 | Kliman et al. | |
| 6,263,265 B1 | 7/2001 | Fera | |
| 6,338,152 B1 | 1/2002 | Fera et al. | |
| 6,343,251 B1 * | 1/2002 | Herron et al. | 701/100 |
| 6,480,810 B1 * | 11/2002 | Cardella et al. | 702/188 |
| 6,556,956 B1 | 4/2003 | Hunt | |
| 6,591,225 B1 * | 7/2003 | Adelman et al. | 702/182 |
| 6,760,689 B1 * | 7/2004 | Follin et al. | 702/188 |
| 6,766,224 B1 * | 7/2004 | Tanaka | 700/287 |
| 6,795,798 B1 * | 9/2004 | Eryurek et al. | 702/188 |
| 6,804,612 B1 * | 10/2004 | Chow et al. | 702/34 |
| 6,839,613 B1 * | 1/2005 | McCarthy et al. | 700/287 |
| 2001/0056335 A1 * | 12/2001 | Ikeda et al. | 702/188 |
| 2002/0107868 A1 * | 8/2002 | Childs et al. | 707/104.1 |
| 2002/0120412 A1 * | 8/2002 | Hayashi et al. | 702/61 |
| 2002/0123864 A1 * | 9/2002 | Eryurek et al. | 702/188 |
| 2002/0123870 A1 * | 9/2002 | Chan et al. | 703/7 |
| 2002/0193969 A1 * | 12/2002 | Frantz et al. | 702/188 |
| 2003/0004659 A1 * | 1/2003 | Hayashi et al. | 702/60 |
| 2003/0041135 A1 * | 2/2003 | Keyes et al. | 709/223 |
| 2003/0083827 A1 * | 5/2003 | Chow et al. | 702/34 |
| 2004/0148129 A1 * | 7/2004 | Gotoh et al. | 702/183 |
| 2005/0033466 A1 * | 2/2005 | Eryurek et al. | 700/108 |

* cited by examiner

*Primary Examiner*—Patrick J. Assouad
(74) *Attorney, Agent, or Firm*—Hunton & Williams

(57) ABSTRACT

A system and method are provided for monitoring the operation of a plurality of turbines in respective operating locations. The method includes inputting operation data from each of the turbines and processing the operation data to generate secondary operation data. Further, the method also includes generating at least one report based on the secondary operation data.

22 Claims, 9 Drawing Sheets

Fig. 3

Tabs: CSM HOME | DAILY MONITORING (104) | SERVICE FACTOR BASE DUTY | SERVICE FACTOR CYCLIC DUTY | STARTING RELIABILITY BASE DUTY | STARTING RELIABILITY CYCLIC DUTY | STARTING RELIABILITY PEAK DUTY November 24, 2001     Click here for a different date

| SITE | TURBINE # | UNIT # | SERVICE FACTOR | STARTING RELIABILITY | DUTY | STATUS |
|---|---|---|---|---|---|---|
| Location A | 29505 | T2 | 100% | NO STARTS | BASE | Operational |
| Location A | 29506 | T2 | 100% | NO STARTS | BASE | Operational |
| Location C | 30154 | T2 | 100% | NO STARTS | BASE | Operational |

| SITE | TURBINE # | UNIT # | SERVICE FACTOR | STARTING RELIABILITY | DUTY | STATUS |
|---|---|---|---|---|---|---|
| Location F | 29508 | T3 | 74% | NO STARTS | CYCLE | Operational |
| Location G | 29509 | T3 | 37% | 67% | CYCLE | Forced outage |
| Location A | 30134 | GT3 | Insufficient Data | Insufficient Data | CYCLE | Planned outage |
| Location A | 30157 | HT2 | 77% | 100% | CYCLE | Unknown |

| SITE | TURBINE # | UNIT # | SERVICE FACTOR | STARTING RELIABILITY | DUTY | STATUS |
|---|---|---|---|---|---|---|
| Location A | 29512 | AHT3 | 0% | NO STARTS | PEAK | Operational |
| Location B | 29513 | T3 | 52% | 67% | PEAK | Planned outage |
| Location B | 40134 | T3 | Insufficient Data | Insufficient Data | PEAK | Unknown |

| SITE | TURBINE # | UNIT # | SERVICE FACTOR | STARTING RELIABILITY | DUTY | STATUS |
|---|---|---|---|---|---|---|
| Location H | 28512 | AT3 | 0% | NO STARTS | NEW | Planned outage |
| Location A | 28513 | AT3 | 52% | NO STARTS | NEW | Planned outage |
| Location R | 43134 | TT3 | 0% | 0% | NEW | Unknown |

Product Service Administrators – click here to change status

Gatekeeper: Joe Computer

SYSTEM AND METHOD FOR PROCESSING OPERATION DATA OBTAINED FROM TURBINE OPERATIONS

BACKGROUND OF THE INVENTION

The invention relates to systems and methods for inputting and processing operation data obtained from a turbine or a number of turbines.

Turbo-machinery original equipment manufacturers, as well as end-users of such equipment, have developed various criteria for assessing the performance of turbines. One of these criteria are known as reliability, availability and maintainability (RAM) definitions, for example. These RAM definitions help the turbine equipment industry gauge how well a particular component or system operates.

Further, service factor and starting reliability parameters have been utilized in the past. This information is typically manually collected through the use of surveys. As a result, the known uses of such information does not provide pro-active or timely information to end-users. Further, the turbine is typically not queried directly for the purpose of obtaining information such as unavailability measurements, for example.

Accordingly, the known processes for collecting and utilizing RAM data, as well as other operation data, fail to convey a variety of needed information. The system and method of the invention address these problems, as well as others.

BRIEF SUMMARY OF THE INVENTION

In accordance with one embodiment of the invention, a system and method are provided for monitoring the operation of a plurality of turbines in respective operating locations. The method includes inputting operation data from each of the turbines and processing the operation data to generate secondary operation data. Further, the method also includes generating at least one report based on the secondary operation data.

In accordance with a further aspect, the invention provides a system for monitoring the operation of a plurality of turbines in respective operating locations, the system comprising:
a data acquisition portion that inputs operation data from each of the turbines; a data processor/calculation portion that processes the operation data to generate secondary operation data; and a data presentation portion that generates at least one report based on the secondary operation data.

In accordance with a further aspect, the invention provides a system for monitoring the operation of a plurality of turbines in respective operating locations, the system comprising: means for inputting operation data from each of the turbines; means for processing the operation data to generate secondary operation data; and means for generating at least one report based on the secondary operation data.

In accordance with a further aspect, the invention provides a method for monitoring the operation of a plurality of turbines in respective operating locations, the method comprising the steps of: inputting operation data from each of the turbines including transmitting the operation data from the turbine to a monitoring entity; processing the operation data, at the monitoring entity, to generate secondary operation data including applying data quality standards against the operation data; and generating at least one report based on the secondary operation data, the report transmitted over the internet; wherein the steps of inputting operation data from each of the turbines, processing the operation data to generate secondary operation data, and generating at least one report based on the secondary operation data are automated.

In accordance with a further aspect, the invention provides a system for monitoring the operation of a plurality of turbines in respective operating locations, the system comprising: a data acquisition portion that inputs operation data from each of the turbines, the operation data being transmitted from the turbine to the data acquisition portion; a data processor/calculation portion that processes the operation data to generate secondary operation data, the data calculation/calculation portion applying data quality standards against the operation data to validate the operation data; and a data presentation portion that generates at least one report based on the secondary operation data, the report transmitted over the internet; wherein operation of the data acquisition portion, the data calculation/calculation portion and the data presentation portion are automated.

In accordance with a yet further aspect, the invention provides a system for monitoring the operation of a plurality of turbines in respective operating locations, the system comprising: means for inputting operation data from each of the turbines including transmitting the operation data from the turbine to a monitoring entity; means for processing the operation data, at the monitoring entity, to generate secondary operation data including applying data quality standards against the operation data; and means for generating at least one report based on the secondary operation data, the report transmitted over the internet; wherein the steps of inputting operation data from each of the turbines, processing the operation data to generate secondary operation data, and generating at least one report based on the secondary operation data are automated.

BRIEF DESCRIPTION OF THE DRAWINGS

The present invention can be more fully understood by reading the following detailed description together with the accompanying drawings, in which like reference indicators are used to designate like elements, and in which:

FIG. 3 is a display screen showing a "daily monitoring" page in accordance with one embodiment of the invention;

DETAILED DESCRIPTION OF THE INVENTION

Figure 1:
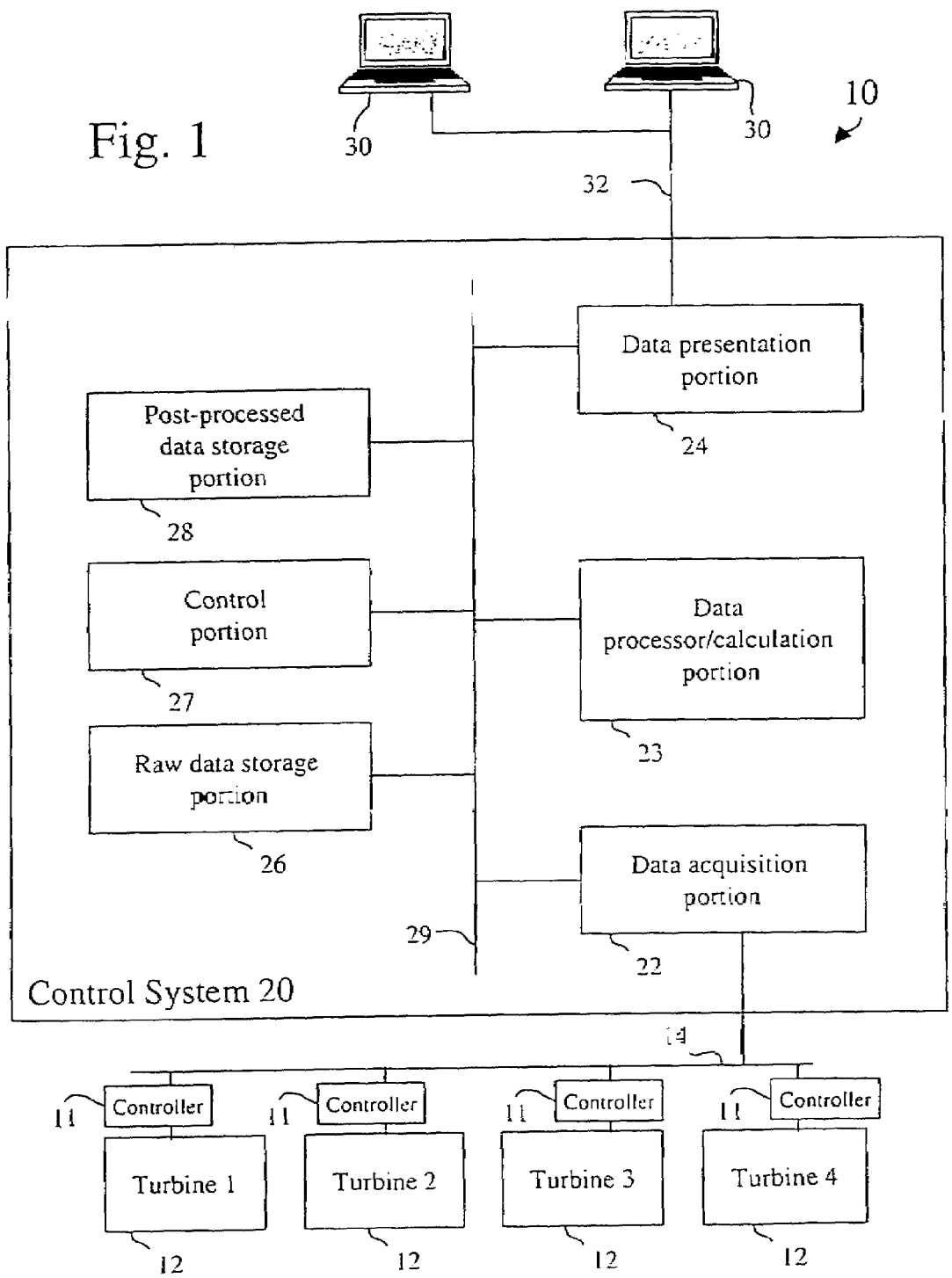
FIG. 1 is a block diagram showing a turbine monitoring system in accordance with one embodiment of the invention.

Hereinafter, aspects of the system and method for monitoring the operation of turbines in accordance with various embodiments of the invention will be described. As used herein, any term in the singular may be interpreted to be in the plural, and alternatively, any term in the plural may be interpreted to be in the singular.

The system and method for monitoring the operation of turbines of the invention are directed to the above stated problems, as well as other problems, that are present in conventional techniques.

The system and method of the invention provide for the effective use of operation data by entities that monitor turbines or end users, for example, including a seller, manufacturer, or an external customer of turbine equipment. In accordance with one embodiment of the invention, this operation data includes what may be characterized as reliability, availability and maintainability (RAM) definitions. The reliability, availability and maintainability (RAM) definitions allow a supplier, or other rotating equipment industry entity, to gauge how well a particular component or system operates, or how a fleet of systems is operating. Typical examples of RAM measurements in the power generation industry include starting reliability, availability, service factor, mean time between failures (MTBF), or B1 life, for example. It should be appreciated that much of the information required to calculate the parameters associated with RAM measurements are, in conventional known techniques, acquired manually and input into calculation or display algorithms.

The system and method of the invention utilizes this operation data, i.e., such as RAM data, in a novel manner. Specifically, in accordance with one embodiment, the invention provides for the automated calculation of any of a wide variety of secondary operation data, such as service factor information, for example, for gas turbines using data automatically collected by a remote monitoring and diagnostic system. Further, in accordance with one embodiment, the invention provides for the automated calculation of starting reliability information for gas turbines, which is automatically collected by a remote monitoring and diagnostic system via the turbine controls system. These calculations can be automated to be performed daily or at other time intervals, i.e., such as weekly or monthly, as desired or required, so as to generate any of a wide variety of secondary operation data.

In further explanation of the system and method of the invention, turbine control systems collect and store data related to safe turbine operation, but typically do not derive secondary and tertiary level information from this data. This is mainly due to the fact that the turbine control system's main purpose is to control and protect the turbine, i.e., a turbine arrangement that either uses or generates power, within the design limits of operation. As a result, turbine control systems are not intended to be a data archive of historical or derived information. However, in the invention, turbine-generator control data is now available for historical and derived calculations in a central location as a result of remote monitoring and diagnostics technology. As a result, RAM measurements, for example, can be utilized to gauge various aspects of turbine use including end-user satisfaction.

In contrast, known manual methods to collect this data do not provide feedback on customer satisfaction in a timely manner. Each day of a turbine-generator forced outage can cost the end-user hundreds of thousands of dollars in lost revenue. Automated processes that provide alerts relative to end-user dissatisfaction are desired to minimize forced outage durations due to failures and other operating restrictions by alerting appropriate entities and/or persons of a potential issue. For example, one of the major causes of end-user dissatisfaction is unavailability. The system and method of the invention estimates unavailability by calculating service factor and starting reliability, as described below.

The system and method of the invention provide a new level of sophistication to the calculation of RAM parameters, as well as other operational data. The system and method of the invention provide a variety of features including the automated calculation on a daily basis of the key RAM parameters that gauge end-user satisfaction, service factor and starting reliability. The system and method of the invention further provide a remote monitoring and diagnostic system with a central database storage capability. The remote monitoring and diagnostic system performs processing, in accordance with some embodiments of the invention, for a fleet of turbine-generators. The data is extracted in such a fashion as to give a minute-by-minute reconstruction of the necessary signals for calculation of Service Factor and Starting Reliability, for example.

In accordance with one illustrative aspect of the invention, gas turbines typically start once per day, therefore the daily accuracy of the calculation of Service Factor would be 1-minute per day or 99%. For Starting Reliability, the accuracy is even higher since a turbine start-stop cycle cannot occur in less than one-minute. Therefore the entitlement of this calculation is not missing any starts, i.e., 100%, i.e., provided there is a complete data set.

In accordance with one embodiment, FIG. 1 is a block diagram showing a turbine monitoring system 10. The turbine monitoring system 10 includes various components as described below. However, it should be appreciated that the various components of the turbine monitoring system 10 can be on one single computer or on multiple computers in any arrangement. Accordingly, the processing performed by a single component, as shown in FIG. 1, might instead be performed by multiple components. Further, the processing performed by two of the components, as shown in FIG. 1, might instead be performed by a single component.

As shown in FIG. 1, the turbine monitoring system 10 includes various operational components. These operational components include a control system 20; a plurality of turbines 12, i.e., a "fleet" of turbines; and a data presentation portion or portions 30.

As shown in FIG. 1, the control system 20 may be connected to the turbines 12 using a suitable network interface 14. For example, the Internet may be used. As shown in FIG. 1, each of the turbines 12 is controlled by a controller 11. The controller 11 for each turbine controls and monitors operations in the turbine 12. The controller may include various components to collect and transmit data to the control system 20.

Also, the control system 20 may be connected to the data presentation portion or portions 30 using a suitable network interface 32. The network interface 32 may be the same or different from the interface 14.

The control system 20 includes various operational components including a data acquisition portion 22, a data processor/calculation portion 23, and a data presentation portion 24. Further, the control system 20 includes a raw data storage portion 26 and a post-processed data storage portion 28. The control system 20 also includes a control portion 27. The control portion 27 controls the overall operations of the control system 20 and performs tasks not performed by the other components. For example, the control portion 27 my contain and implement data quality subroutines as described further below. Further, for example, the control portion 27 might control a user adjusting the manner in which data is processed in the control system 20, i.e., such as a user or administrator changing threshold values.

The turbines 12 generate a variety of operation data that is output to the data acquisition portion 22 in the control system 20 utilizing the network interface 14, or in any other suitable manner. This data output by the turbines may be "raw" data, i.e., data that has not been processed in any substantial way other than transmission. The operation data may include, for example, turbine power output, turbine rotational speed, and turbine load attributes.

It should be appreciated that any of a wide variety of components and technology may be used to prepare the data at the respective turbines 12 and forward the data to the data acquisition portion 22. For example, known data overload devices may be utilized. Further, extra processors may be needed at the turbines 12 or in the control system 20 in order to handle the volume of data.

Once the data is received in the data acquisition portion 22, the data may be immediately processed by the data processor/calculation portion 23 so as to be immediately displayed by the data presentation portion 30, in accordance with one embodiment of the invention. Alternatively, the data that is input by the data acquisition portion 22 may be placed into the raw data storage portion 26.

In accordance with one embodiment of the invention, the raw data storage portion 26 houses sufficient data for a particular period in question. Illustratively, the data period may be one day or 24 hours. For example, an entire data set may be analyzed at 1-minute intervals and an assessment performed by the control system 20 as to whether the turbine is running or not, or alternatively, whether there is a start event.

If the data that is input by the data acquisition portion 22 is placed in the raw data storage portion 26, the data processor/calculation portion 23 will then process the data in the invention at some later time. The data processor/calculation portion 23 performs a variety of processing on the data, as is described further below. For example, the data processor/calculation portion 23 performs a quality analysis of the input data. Further, the data processor/calculation portion 23 may perform availability and reliability calculations.

Once the data processor/calculation portion 23 does process the data that is input by the data acquisition portion 22, the data processor/calculation portion 23 outputs the post processed data to the post-processed data storage portion 28. The post-processed data in the post-processed data storage portion 28 is then available for use by the control system 20, as is desired. Alternatively, the data processor/calculation portion 23 may output the post processed data to a suitable output device such as a web page, printer, or some other medium.

For example, in accordance with one embodiment of the invention, the data presentation portion 24 retrieves desired data from the post-processed data storage portion 28 and presents that post-processed data to the data presentation portion or portions 30. This presentation may be performed in the manner of using a web page, for example. One embodiment of such a web page, showing various information regarding a fleet of turbines, is described in detail below.

It should be appreciated that the data acquisition portion 22 may input any of a wide variety of data from the turbines 12. For example, in accordance with one embodiment of the invention, turbine service factor is determined by the data processor/calculation portion 23 by looking at the generator output signal, which is obtained from a particular turbine 12. This generator output signal may be obtained using a sensor at the turbine 12. This sensor then transmits the obtained information to the control system 20 via the network interface 14. When the sensor value exceeds 5 mega-watts (MW) the turbine is considered in service. When the value drops below that value, the turbine is considered out of service. However, it should be appreciated that any suitable positive value may be used, but 5 MW has been observed to be particularly robust against data anomalies In accordance with a further aspect of the invention, turbine starting reliability is calculated by calculating the ratio of start attempts to start successes. Start attempts are incremented when the turbine shaft accelerates from a value of less than 30% of full revolutions per minute (rpm) to a value of greater than 30%. Start successes are incremented when the power generated in the generator exceeds 5 MW. However, it should of course be appreciated that other criteria could be used to determine service factor and starting reliability.

The system and method of the invention provide for the use of determining information regarding a fleet of turbines via a simple and robust method using remotely acquired data from respective on-site turbine controllers. Accordingly, the system and method of the invention provide for leveraging the value of remotely acquired site data. This data may then be displayed on an intranet or the Internet. Further, the data may be easily and routinely updated, i.e., such as daily. As a result, the invention may be used to provide online updates to external customers as a value added service.

Figure 2:
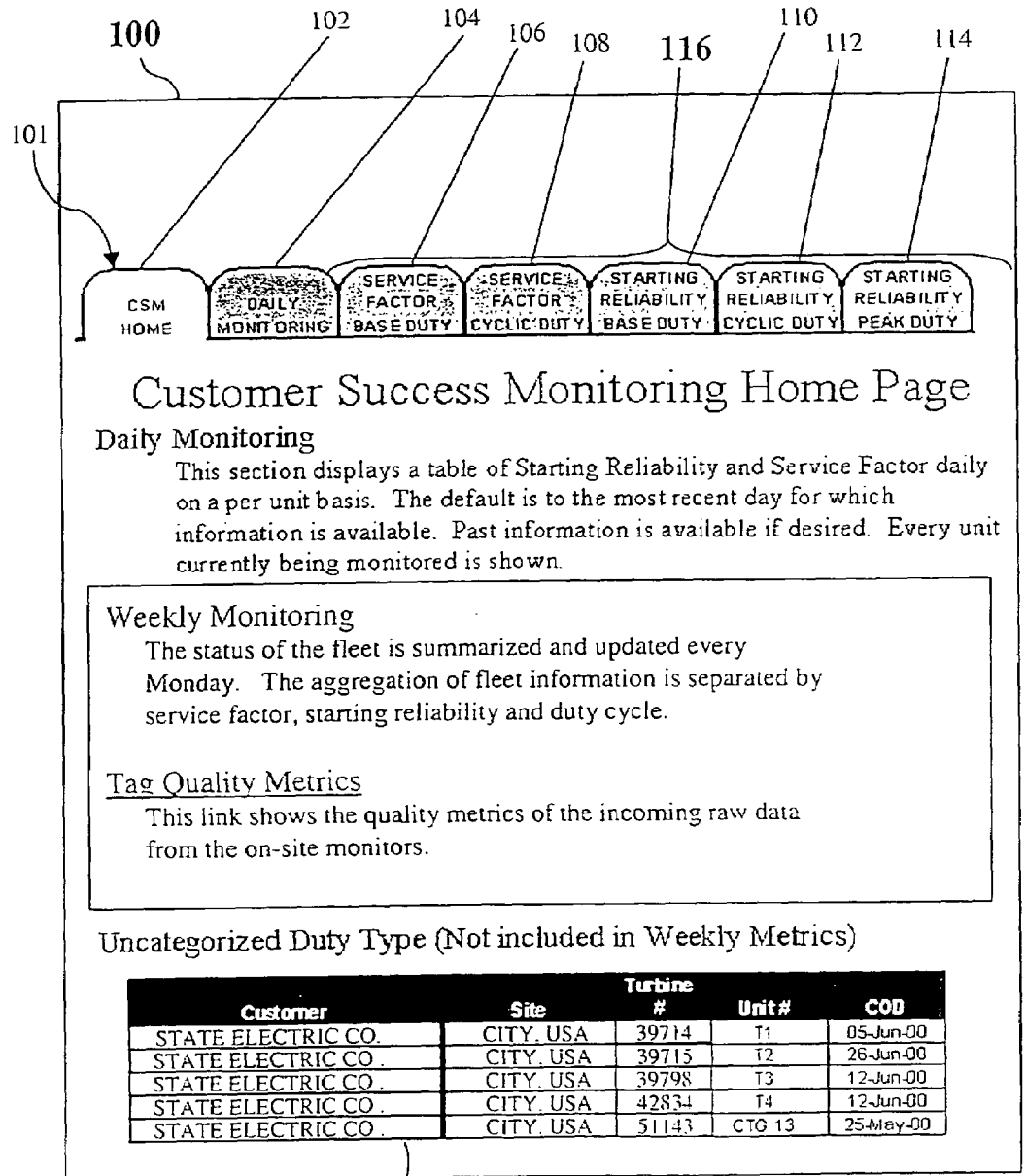
FIG. 2 is a display screen showing a "customer success monitoring" home page, including various tabs, in accordance with one embodiment of the invention.

In accordance with one illustrative embodiment of the invention, FIG. 2 is a display screen showing a "customer success monitoring" home page 100, including various tabs, in accordance with one embodiment of the invention. Specifically, the home page 100 includes tab graphic 101. The tab graphic 101 includes a customer success monitoring (CSM) home tab 102, a "daily monitoring" tab 104, a "service factor base duty" tab 106, a "service factor cyclic duty" tab 108, a "starting reliability base duty" tab 110, a "starting reliability cyclic duty" tab 112, and a "starting reliability peak duty" tab 114. Each of the tabs (102–114) are in the form of active hyperlinks and access a different resource, i.e., a different page, in accordance with one embodiment of the invention.

To explain further, a turbine may be characterized, for example, as having different duty classifications, as the pages 130 and 140 reflect. That is, a turbine may be characterized as having a "base" duty, a "cycle" duty, a "peak" duty cycle, or a "new" duty, for example. A turbine characterized as a "base" duty turbine operates more or less continuously. In contrast, a turbine characterized as a "peak" duty turbine operates only on selected occasions. For example, such selected occasions might be when the price of electricity is particularly high. Further, a turbine characterized as a "cycle" duty turbine operates somewhere between the operation of a peak duty turbine and a base duty turbine. Thus, a cycle duty turbine might operate 60% of the time. In contrast, a peak duty turbine might operate 25% of the time, and a base duty turbine might operate 95% of the time. In accordance with one embodiment of the invention, the pages 130 and 140 also reflect a duty classification of "new." A "new" turbine, for example, might be a turbine that is not yet fully operational and thus cannot be assigned a base, cycle or peak duty classification. Further aspects of the base, cycle, peak and new duty classifications, and the manner in which such classifications are used to generate permutations with "service factor" and "starting reliability", i.e., so as to result in the weekly monitoring pages 116, are described further below In accordance with one embodiment of the invention, the "service factor base duty" tab 106, the "service factor cyclic duty" tab 108, the "starting reliability base duty" tab 110, the "starting reliability cyclic duty" tab 112, and the "starting reliability peak duty" tab 114 may collectively be characterized as "weekly monitoring pages" 116. The purpose of the weekly monitoring pages 116 is to display information about the fleet on a week to week basis. Accordingly, the information displayed on such pages may be updated on a weekly basis. Further aspects of the weekly monitoring pages 116 are described below. However, it should be appreciated that the system and method of the invention may be used with any period of time and is not limited to the week. For example, a month period might be utilized instead.

As shown in FIG. 2, the customer success monitoring home page 100 includes various information relating to daily monitoring, weekly monitoring, and tag quality metrics, as described further below. For example, the daily monitoring information explains what may be found under the "daily monitoring" tab 104, i.e., that the daily monitoring information includes a table of starting reliability and service factor information on a per unit basis.

Further, it should be appreciated that any of a wide variety of additional information may be included on the home page 100 as is desired. For example, the home page 100 as shown in FIG. 2 includes, below the descriptive text, a data table listing 120. The data table listing 120 lists monitored units that have not been classified by duty cycle. It should of course be appreciated that the information in the data table listing 120 may be presented in some other manner, for example. Illustratively, the data table listing information might be accessible, by the user, by a yet further hyperlink.

As shown in FIG. 2, the weekly monitoring information explains that the status of the fleet is summarized and updated every Monday, for example, and further, that the aggregation of fleet information may be separated by service factor, starting reliability and duty cycle, for example.

Further, the home page 100 includes a link to the "tag quality metrics." The information available under this link includes the quality metrics of the incoming raw data from the on-site monitors and sensors, as well as the impact of this information on the customer. Further aspects of the tag quality metrics will be described below.

As shown in FIG. 2, the home page 100 includes a "daily monitoring" tab 104 in accordance with one embodiment of the invention. The daily monitoring tab 104 allows a user to access two further pages. FIG. 3 is a display screen showing one of these pages, i.e., the "daily monitoring" page 130 in accordance with one embodiment of the invention. The page 130 is available to all users who select the daily monitoring tab 104.

Figure 4:
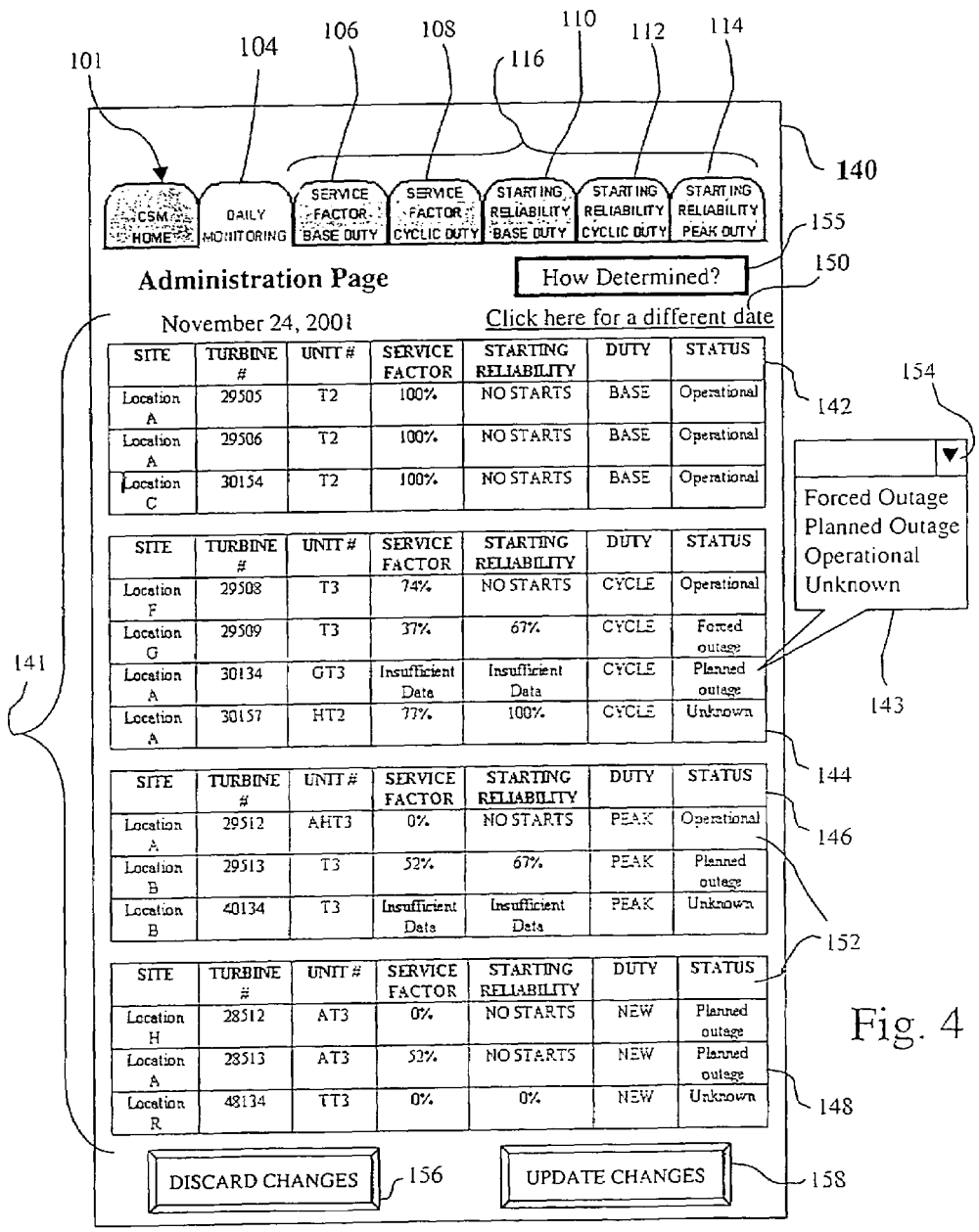
FIG. 4 is a display screen showing an "administration" page in accordance with one embodiment of the invention.

The second page that is accessible from the daily monitoring tab 104 is an administration page. FIG. 4 is a display screen showing an illustrative administration page 140. The administration page 140 is only accessible by designated individuals, i.e., such as product service administrators or product service engineers, for example. For example, access is protected by utilizing a user ID and Password. The purpose of the administration page is to allow designated persons to change the status displayed on the daily monitoring page 130.

As shown in FIG. 3, the page 130 includes the tab graphic 101. Below the tab graphic 101, the page 130 includes descriptive text. The descriptive text shows the date of the various data in the tables included in the page 130. The data displayed in the tables should of course match the date shown on the page 130. Further, next to the date is a link for selecting a different date. However, it should of course be appreciated that any suitable method that allows a user to change the date is acceptable, i.e., a method may be used that does not use a link.

As shown in FIG. 3, below the descriptive text is a data table 131 listing the various monitored units and their respective success metrics, duty cycle, and operational status. When the system of the invention accesses this page via the link on the tab graphic 101 from any other page, the default date for data is the most recent, i.e., the most recent date on which data was taken in accordance with one embodiment of the invention.

The data table 131 includes four separate tables (132, 134, 136, 138). The four separate tables respectively pertain to different "duty" classifications. That is, the table 132 pertains to "base" duty. The table 134 pertains to "cycle" duty. The table 136 pertains to "peak" duty. Lastly, the table 138 pertains to a "new" duty classification.

Each of the four separate tables (132, 134, 136, 138) contain various information about and obtained from turbines in the fleet. For example, the table 132 includes site, turbine number, and unit number. Regarding the performance of each turbine, the table 132, for example, also contains "service factor" and "starting reliability" information. Further, the table 132 includes the "duty" information and "status" information. It should be appreciated that the illustrative page 130 may contain a variety of other information or data, as is desired, and is not limited to the information shown in FIG. 3.

The data table 131 as shown in FIG. 3 includes the status column, as described above. The data displayed in this status column may come from a data field from the database that stores the daily information for the creation of this table. The product service administrators can change the values in this field utilizing the page 140 as shown in FIG. 3.

Prior to a product service administrator changing the data that populates the status column, the system needs to populate predetermined values for initial display. An illustrative logic for populating the predetermined values is described below. Below the data table 131, the system of the invention presents a link 139. The link 139 may be selected by product service administrators when they desire to change the data in the status column.

Selecting the link for a different day causes the system to request the desired day from the user. When the user provides a date that is in the database, the page 130 is refreshed with the user's selected date and appropriate data. Upon a product service administrator, for example, selecting the link 139, the system prompts the user for a login ID and password. Upon receiving a valid ID and password, the system passes the user to the page 140 shown in FIG. 4, with the current date shown in the page 130. Failure of the ID and password produces an "access denied" message and returns the user to the page 130.

In further explanation of the "status" column shown in FIG. 3, this column may initially be populated with predetermined values for initial display. Further, in accordance with one embodiment of the invention, there are only four allowable values for the status data field. These four allowable values are FORCED OUTAGE, PLANNED OUTAGE, OPERATIONAL AND UNKNOWN.

An illustrative logic for determining which of these four values to populate into this data field for each turbine is described below, and illustrated by the flowchart shown in FIG. 5. When this logic is executed, another data field may be populated for each record, i.e., a "how determined" field. This data field may be accessible and viewed by a user in any suitable manner. This additional data field identifies how the status was determined. If the status is determined by this logic, the "how determined" field should store "system default" unless specified otherwise. Further, if an administrator changes the status, then the "how determined" field should store an appropriate indicator of the administrator change, i.e., such as "Admin." In accordance with one embodiment of the invention, the "how determined" field may be accessed by selecting the "How Determined?" button 155 as shown in FIG. 4. The format of the "how determined" field may be constructed in any suitable manner.

As described below, the process of the invention may utilize a color coding scheme in the page 130 and the page 140, for example. Such a color coding scheme enhances the presentation of the page 130. That is, for example, the process of the invention may utilize a green region of values, a red region of values and an orange region of values for the "service factor" column shown in the data table 131 of FIG. 3. This color coding scheme creates a visual aid in assessing the service factor data, for example. In accordance with one embodiment of the invention, and as referenced in the discussions of the process of FIG. 5, the color coding scheme for the service factor column may be as follows:

Green Region=80% to 100%;

Orange Region=60% to 80%; and

Red Region=0% to 60%.

However, it should be appreciated that any suitable range for the scheme may be used. Further, a color coding scheme may not be used at all.

Figure 5:
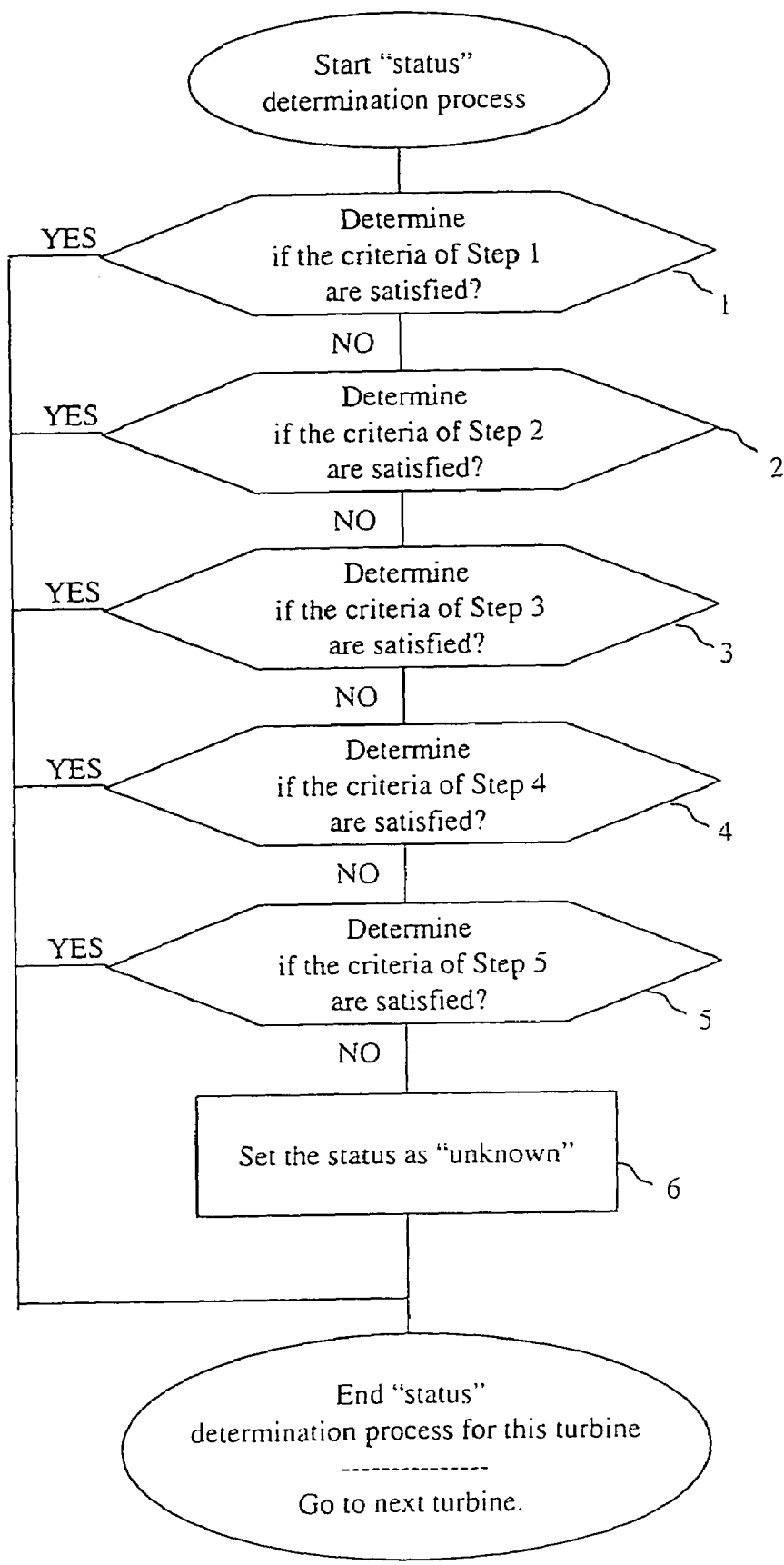
FIG. 5 is a flow chart showing a "status" determination process in accordance with one embodiment of the invention.

The flowchart of FIG. 5 illustrates the manner in which the "status" of a particular turbine is determined. As shown in the flowchart of FIG. 5, after the process starts, the process passes to step 1. In step 1 various conditions are considered based on the input received by the control system 20 from a particular turbine. Specifically, in step 1 of the process, if the Service Factor is in a green region of values, as might be utilized on the page 130, then the system sets the status as OPERATIONAL. Then, the remaining steps 2–6 described below are skipped and the process moves on to the next turbine, as shown in the flowchart of FIG. 5. Alternatively, if the conditions of step 1 are not satisfied, the process passes to step 2.

In step 2, the process may determine that the Service Factor is 0% or is not calculated due to insufficient data, i.e., such as failed validity checks, or the like; and the process performed by the control system 20 may determine that the Status for this specific turbine on the previous day was operational or unknown. In this situation, the system sets the Status as UNKNOWN, skips the remaining steps of the flowchart of FIG. 5, and moves on to the next turbine. Alternatively, if the conditions of step 2 are not satisfied, the process passes to step 3.

In step 3, the process may determine that the service factor is 0%; and the starting reliability is 0%. In this situation, the system sets the status as UNKNOWN, skips the remaining steps and moves on to the next turbine. Alternatively, if the conditions of step 3 are not satisfied, the process passes to step 4.

In step 4, the process may determine that the Service Factor is 0% or is not calculated due to insufficient data, i.e., such as failed validity checks, etc., and that the Status for this specific turbine on the previous day was set by a product service administrator as forced or planned outage. As a result, the system will set the status to the same value from the previous day (FORCED OUTAGE or PLANNED OUTAGE). Further, the system skips the remaining steps and moves on to the next turbine. Alternatively, if the conditions of step 4 are not satisfied, the process passes to step 5.

With further explanation of step 4, since the previous day's status was set by an administrator, the "how determined" field should store "Admin" and not "system default". The purpose for this is to prevent this logic from changing an "outage" status identified by an administrator to an "unknown" status. It should also be noted that the system of the invention might link or have access to a database to determine if a particular unit is in a planned or forced outage.

As described above, if the conditions of step 4 are not satisfied, the process passes to step 5. In step 5, if the service factor is greater than 0%, but is in the RED or ORANGE Region of values, then the process sets the status as UNKNOWN. Further, the process skips the remaining step 6 and moves on to the next turbine. Alternatively, if the conditions of step 5 are not satisfied, the process passes to step 6.

Step 6 pertains to all other situations not covered by steps 1–5. In step 6, the process sets the status as UNKNOWN. After step 6, the process passes on to the next turbine in step 7, as shown in FIG. 5.

Hereinafter, further aspects of the administration page 140 will be described. The construction of this page is very similar to the page 130. However, there are various differences in accordance with one embodiment of the invention. For example, in the page 140, each cell in the status column is a drop down box 143. A further difference is that the link on the bottom of the page 130 to access the page 140 is replaced with two program execution buttons in the page 140. Further, the title of "Administration Page" is shown in the page 140.

The following describes similarities and differences of the page 140 versus the daily customer success page 130. Where differences between the two pages are not discussed, the primary scenario of the page 130 applies, in accordance with one embodiment of the invention.

As shown in FIG. 4, the tab graphic 101 is displayed across the top of the page 140 as described in conjunction with the page 130. Further, descriptive text is displayed below the tab graphic 101. The text includes the title "Administration Page" and shows the date of the data in the data table 141. That is, the data table 141 includes the tables (142, 144, 146 and 148). The default date to display on the page 140 is the date that was displayed on the page 130. Next to the date on the page 140 is a link 150 for selecting a different date. Any method that allows a user to change the date is acceptable, i.e., rather than the use of a link.

In accordance with one embodiment of the invention, selecting the link 150 for a different day causes the system to request the desired day from the user. When the user provides a date that is in the database, this page is refreshed with the user's selected date and appropriate data.

The data displayed in "status" fields 152, as shown in FIG. 4, are the values from the appropriate data table, i.e., which may be stored in the post-processed data storage portion 28, for example. Each status field 152 may be selected by an authorized user, i.e., such as double clicking, so as to generate the drop down box 143. When the cursor passes over the down arrow 154 that activates the drop down feature, the list of 4 possible choices appears, in accordance with one embodiment of the invention. The four possible choices are: FORCED OUTAGE, PLANNED OUTAGE, OPERATIONAL, and UNKNOWN.

If the user selects a value from the drop down box 143, the status of that specific table cell changes, but the value in the data table does not change. Further, the user, i.e., an administrator, may change the status on more than one turbine without the page 140 updating after each "drop down box" selection by the user. It should be appreciated that a user might change the information in the "status" field 152 based on information known to the administrator. For example, the administrator may have spoken to an on-site engineer.

In accordance with one embodiment of the invention, if the user selects any of the links in the tab graphic 101 along the top of the page 140, the system does not update any changes to the data table 141. Selecting a link in the tab graphic 101 passes the user to the appropriate page, as desired.

As shown in FIG. 4, below the data table 141 two program execution buttons (156,158) are disposed, in accordance with one embodiment of the invention. The "DISCARD CHANGES" button 156 is on the bottom left, and the "UPDATE CHANGES" button 158 is on the bottom right when viewing the page 140.

Selection of the "DISCARD" button 156 passes the user back to the page 130 without changing the status data. Upon returning to the page 130, the date shown by the page 130 should match the date from the page 140 when the "DISCARD" button was selected. A warning message may be appropriate, i.e., to alert the user to a change in the date. Alternatively, selection of the "UPDATE" button 158 passes the user back to the page 130 after updating the status data. Upon returning to the page 130, the date shown by the page 130 should match the date from the page 140 when the "UPDATE" button 158 was selected.

As described above, a user may select any of the tabs in the tab graphic 101, as is desired. As also described above, in accordance with one embodiment of the invention, the "service factor cyclic duty" tab 108, the "starting reliability base duty" tab 110, the "starting reliability cyclic duty" tab 112, and the "starting reliability peak duty" tab 114 may collectively be characterized as "weekly monitoring pages" 116. The purpose of the weekly monitoring pages 116 is to display information about a fleet of turbines on a week to week basis. The weekly monitoring pages 116 are, for example, updated every Monday morning.

Figure 6:
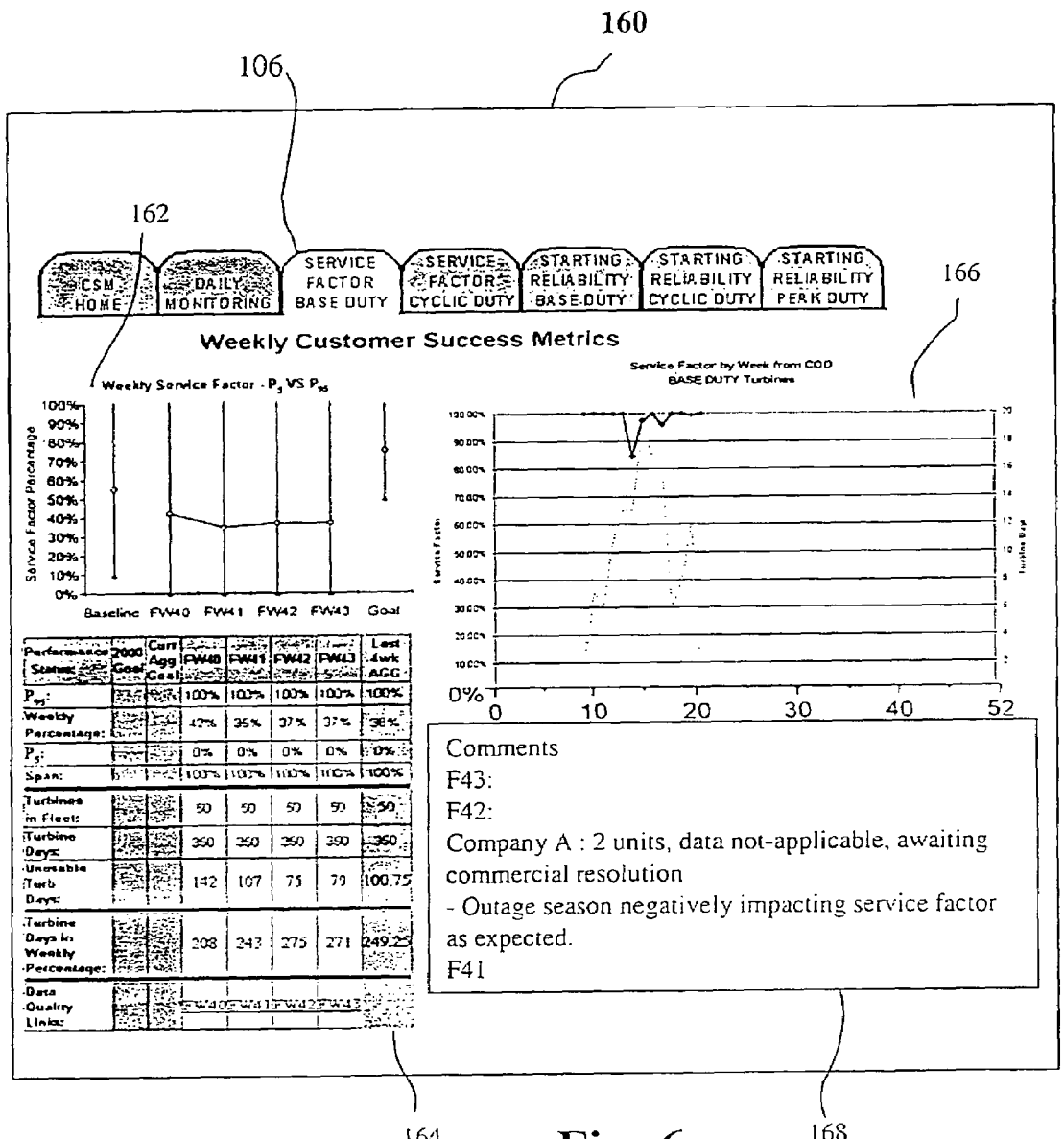
FIG. 6 is a display screen showing an illustrative "service factor base duty" page in accordance with one embodiment of the invention.

The pages in the weekly monitoring pages 116 may differ by Service Factor, Starting Reliability, and Duty Type. Each page, which is accessed by the tabs (106–114), has two graphs and a data table in accordance with one embodiment of the invention. FIG. 6 is a display screen showing an illustrative "service factor base duty" page 160. The page 160 of FIG. 6 shows an example of how all five of the weekly monitoring pages 116 may be constructed.

As shown in FIG. 6, a graph 162 in the upper left of the page 160 shows the customer success metric over the past 4 fiscal weeks (FW). A table 164 below this graph has a variety of data. Further, a graph 166 in the upper right of the representative page 160 shows the customer success metric by weeks from the commercial operation date (COD). As may be observed, the information shown in the graph 166 is very different than the information of the past 4 fiscal weeks, as shown in the graph 162. Further, a comments box 168 may be included in the page 160. The comment box 168 may present any of a wide variety of information, as is desired by a particular monitoring entity or end user, for example.

The two customer success metrics (service factor and starting reliability) combined with the three types of duty cycle classification (Base, Cyclic, and Peak), as described above, results in six possible sets of graphs or information. However, all six possible sets of graphs may not be desired. For example, a user may not desire to monitor service factor for peak duty units, thus only five pages are constructed for weekly monitoring, i.e., which may be accessed by the tabs (106–114).

Further, it should be appreciated that a particular end user, for example, may not wish the operational data to be segregated into the respective graphs, as accessed by the weekly monitoring pages 116. Rather, an end user might wish, for some reason, that the operational data all be grouped together in accordance with one embodiment of the invention. However, it is noted that the segregation of data, as proposed herein, may provide substantial assistance in understanding and utilizing the operational data.

Hereinafter, further aspects of generation of the information shown in FIG. 6 will be described in accordance with one embodiment of the invention. In particular, aspects of the "WEEKS FROM COMMERCIAL OPERATION DATE (COD)" data creation will be described with reference to FIG. 6, as well as the flowchart of FIG. 7. The process for creating a "Weeks from COD" graph 166 is similar for each combination of success metric and duty cycle. Consequently, the process for determining the information necessary for the weekly monitoring pages is illustratively described with reference to FIG. 6. This process may be run once a week, such as on a Monday morning, for example. As used herein, the COD is the date on which the end user, for example, starts generation of income from the turbine, i.e., by putting power on a desired grid.

Figure 7:
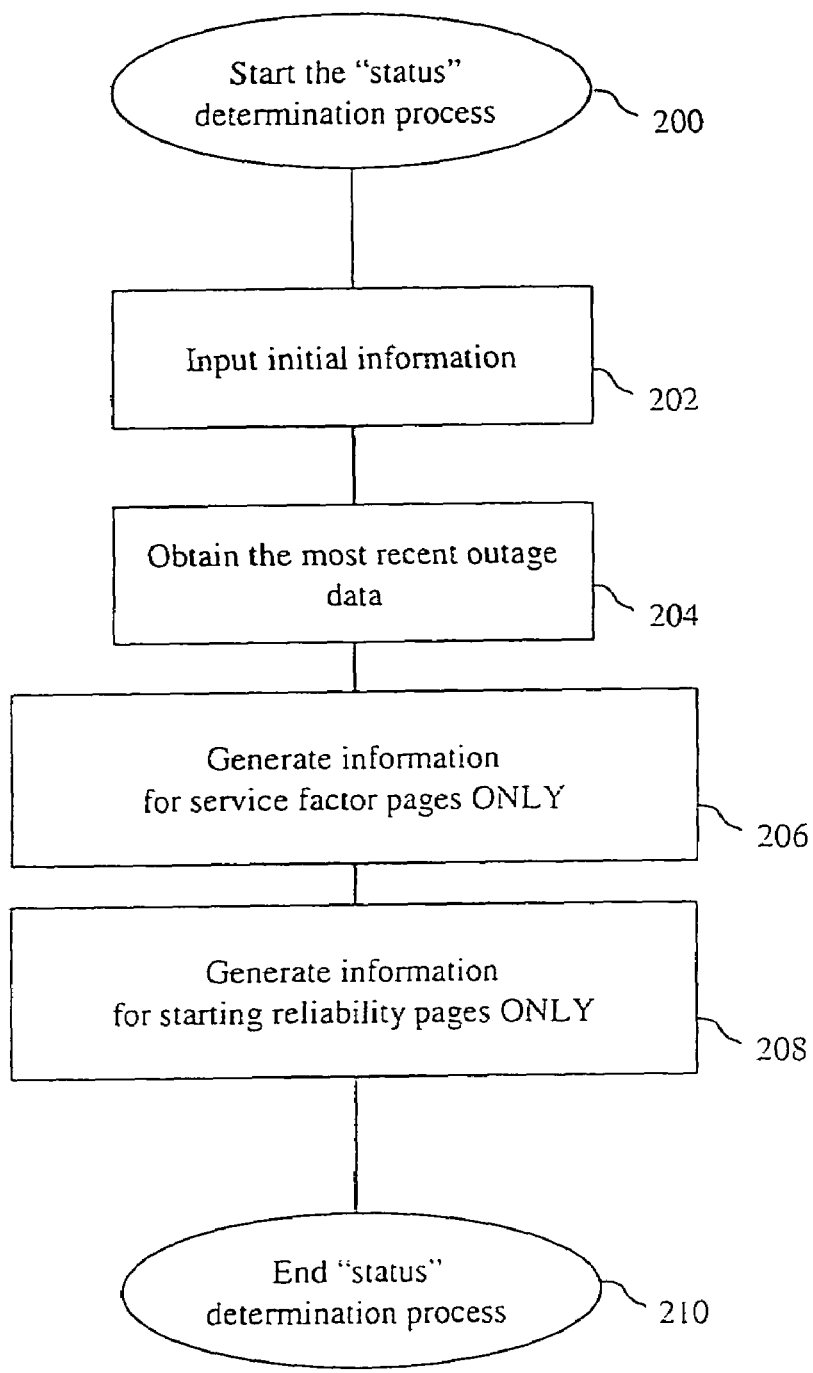
FIG. 7 is a flow chart showing a page generation process in accordance with one embodiment of the invention.

FIG. 7 is a flowchart showing the information generation process, in accordance with one embodiment of the invention. As shown in FIG. 7, the process starts in step 200. Then, the process passes to step 202. In step 202, initial information is input for processing. In particular, the duty cycle assignment of each turbine should be available in the data. Further, the classification of each turbine may be provided. Alternatively, the system may determine what duty cycle to assign to each turbine based on some input or criteria. In addition, information may be used that was obtained from the purchaser at the time of purchase of the turbine. This information might reflect the intended use of the turbine, for example. After step 202 as shown in FIG. 7, the process passes to step 204.

In step 204, the most recent outage data needs to be extracted from a designated database, i.e., such as the raw data storage portion 26. If the designated database is unavailable for a fresh extract, the process may use the most recent extract, and based on the most recent extract, continue the process. In accordance with one embodiment of the invention, the only outage data of interest to the remainder of the process of FIG. 7 are the dates of non-planned outages. Dates of planned outages are not to be used. The planned outages data may be filtered out in any suitable manner.

After step 204, the process passes to step 206. In step 206, information is generated for the service factor pages. Alternatively, if the generation of information is desired only for the starting reliability pages, then the process may pass directly to step 208, which is described below.

In step 206, the process disregards all data prior to the turbine's commercial operation date (COD). Further, as noted above, planned outages should be excluded from the designated database extract. This is because data during a forced outage should negatively impact the values calculated for the Weeks from COD graph. Planned outages should not be used in the Weeks from COD graphs, thus, this results in the desired exclusion of planned outages from the process.

With the planned outages discussed in the previous paragraph considered, the process disregards any turbine-day service factor data where the date and the turbine of the turbine-day match the planned outages. Further, it should be appreciated that for the service factor, the out of service date, returned to service date, as well as all the days between the out of service date and the returned to service date in the days of planned outages, are days that should be excluded in the roll up of fleet service factor.

Further, the processing in step 206 of FIG. 7 includes the process disregarding any service factor data where the quality checks for the corresponding turbine-day failed.

As a result, the process leaves a remaining set of service factor turbine-day data points. For all these service factor turbine-day data points remaining, the process determines the applicable week from COD in accordance with one illustrative embodiment of the invention as follows:

$$\text{Week From } COD = \{\text{Truncate}[(\text{Date of turbine\_day} - COD \text{ of turbine})/7]\} + 1 \quad \text{Equation 1}$$

However, it should be appreciate that any suitable logic may be used to determine the week from COD. Using the above equation, the (Date of turbine_day–COD of turbine) has units of DAYS and should result in a positive value.

In accordance with this embodiment of the invention, only weeks 1 through 52 are used for the "Weeks from COD" graphs. The process calculates the fleet average for service factor for each week from COD for both the BASE and CYCLIC duty units. Then, the process saves this data as the data will be used for the graphs created for the service factor base duty page and the service factor cyclic duty page, as accessed by the tabs 106 and 108. The process further saves the number of turbine-day data points that were used to calculate the average for each week from COD. This will be graphed as well with a secondary axis scale.

After step 206 as shown in FIG. 7, the process passes to step 208. In step 208, the process generates information for the "starting reliability pages."

In step 206, the process disregards all data prior to the turbine's COD. Further, it should be noted that, in accordance with this embodiment of the invention, planned outages should be excluded from the designated database extract. This is because data during a forced outage should negatively impact the values calculated for the "Weeks from COD" graph. Planned outages should not be used in the Weeks from COD graphs, thus this results in the exclusion of planned outages from the processing of step 208.

With the planned outages discussed in the previous paragraph considered, the process disregards any "turbine-day service factor" data where the date and the turbine of the turbine-day match the date of the planned outages. That is, for starting reliability, the out of service date and all days between the out of service and return to service date during a planned outage should be excluded in the roll up of fleet starting reliability. The starting reliability data on "returned to service" dates is to be included in the fleet roll up of starting reliability.

It should be appreciated that the quality checks may result in the "returned to service dates" from being excluded in the roll up of fleet starting reliability. The quality checks may be performed to allow for inclusion of starting reliability on return to service days. This may be desirable since the starting reliability is of great concern following an outage.

Then, the processing as performed in step 208 disregards any starting reliability data where the quality checks for the corresponding turbine-day failed. It should be appreciated that these quality checks, as well as the other quality checks described herein, may utilize any of a wide variety of criteria, as desired.

As a result, the process leaves a remaining set of starting reliability turbine-day data points. For all these service factor turbine-day data points remaining, the process determines the applicable week from COD in accordance with one illustrative embodiment of the invention as follows:

$$\text{Week From } COD = \{\text{Truncate}[(\text{Date of turbine\_day} - COD \text{ of turbine})/7]\} + 1 \quad \text{Equation 2}$$

However, it should be appreciate that any suitable logic may be used to determine the week from COD. Using the above equation, the Date of turbine_day–COD of turbine has units of DAYS and should result in a positive value.

In accordance with this embodiment of the invention, only weeks 1 through 52 are used for the "Weeks from COD" graphs. The process calculates the fleet roll up for starting reliability for each week from COD for all duty types (BASE, CYCLIC, & PEAK). The process then saves this data as it will be used for the generation of the graphs created in the "starting reliability base duty" page, the "starting reliability cyclic duty" page, and the "starting reliability peak duty" page, as accessed by tabs 110, 112 and 114, respectively.

It should be noted that there will be turbine-days where no starts were attempted. Thus, the roll up of the fleet starting reliability is not the average of each turbine-day starting reliability. Instead, the roll up is calculated as follows:

$$SRn = (S \text{ Successful Starts in week } n) / (S \text{ Attempted Starts in week } n) \quad \text{Equation 3}$$

where n is the week from COD.

Further, the process of step 208 as shown in FIG. 7 also saves the number of turbine-day data points that were used to calculate the fleet roll-up for each week from COD. This information will be graphed as well, i.e., with a secondary axis scale, in accordance with one embodiment of the invention.

As described above, FIG. 6 is a page 160 that shows "service factor base duty" information. The page 160 includes the fiscal week (FW) graph 162 in the upper left corner. The graph 162 plots service factor percentage against each respective unit. It should be appreciated that planed outages may be removed from the roll up of the data used to generate the graph 162.

The page 160 also includes the table 164. The table 160 includes a variety of useful information including turbines in the Fleet, for example only the number of BASE DUTY units may be reported; and Turbine Days, i.e., the value is the number of turbine days used in the roll up.

Further, the graph 164 reflects the impact of scheduled outages. That is, the table 164 shows Unusable Turbine Days. The Unusable Turbine Day may be determined from the population of Turbine Days as described above. The Unusable Turbine Days are those days that fail the quality checks.

Further, the page 160 includes the Weeks from COD graph 166 in the upper right corner. This graph is plotted using the SERVICE FACTOR BASE DUTY data calculated as described above in conjunction with FIG. 7. It should be appreciated that the system and method of the invention may utilize any suitable manipulation, processing or calculation of the obtained data, as is desired.

The page 160 also provides further available resources. Specifically, the page 160 includes the "service factor cyclic duty" tab 108, the "starting reliability base duty" tab 110, the "starting reliability cyclic duty" tab 112, and the "starting reliability peak duty" tab 114. Each of these further resources will be described in turn below.

The selection of the "service factor cyclic duty" tab 108 by a user results in the system generating a "service factor cyclic duty" page. This "service factor cyclic duty" page substantially corresponds in appearance to the page 160, but with several variances of note. Accordingly, a "service factor cyclic duty" page is not shown in the drawings, but rather the variances between the a "service factor cyclic duty" page and the page 160 are described below.

The creation of the FW graph in the upper left corner of the a "service factor cyclic duty" page is unchanged, as compared with the page 160, with the exception that only CYCLIC DUTY units are used in the fleet roll-up. Planed outages need to be removed from the roll up of this data as well.

Further, the creation of the table in the lower left corner of the "service factor cyclic duty" page is unchanged with the exception of the following fields:

Turbines in Fleet: Only the number of CYCLIC DUTY units are reported;

Turbine Days: The value is the number of turbine days used in the roll up. The impact of forced outages needs to be included; and Unusable Turbine Days: From the population of Turbine Days as described above, the Unusable Turbine Days are those that fail the quality checks.

Further, in the Weeks from COD graph in the upper right corner of the a "service factor cyclic duty" page is plotted using the SERVICE FACTOR CYCLIC DUTY data calculated from the processing described in conjunction with FIG. 7 above. It should be appreciated that the system and method of the invention may utilize any suitable manipulation, processing or calculation of the obtained data, as is desired.

The selection of the "starting reliability base duty" tab 110 by a user results in the system generating a "starting reliability base duty" page. This "starting reliability base duty" page substantially corresponds in appearance to the page 160, but with several variances of note. Accordingly, a "starting reliability base duty" page is not shown in the drawings, but rather the variances between the a "starting reliability base duty" page and the page 160 are described below.

The creation of the FW graph in the upper left corner of the a "starting reliability base duty" page is unchanged, as compared with the page 160, with the exception that only BASE DUTY units are used in the fleet roll-up. Planed outages need to be removed from the roll up of this data as well.

Further, the creation of the table in the lower left corner of the "starting reliability base duty" page is unchanged with the exception of the following fields:

Turbines in Fleet: Only the number of BASE DUTY units are reported;

Turbine Days: The value is the number of turbine days used in the roll up. The impact of forced outages needs to be included; and Unusable Turbine Days: From the population of Turbine Days as described above, the Unusable Turbine Days are those that fail the quality checks.

Further, in the Weeks from COD graph in the upper right corner of the a "starting reliability base duty" page is plotted using the STARTING RELIABILITY BASE DUTY data calculated from the processing described in conjunction with FIG. 7 above. It should be appreciated that the system and method of the invention may utilize any suitable manipulation, processing or calculation of the obtained data, as is desired.

The selection of the "starting reliability cyclic duty" tab 112 by a user results in the system generating "starting reliability cyclic duty" page. This "starting reliability cyclic duty" page substantially corresponds in appearance to the page 160, but with several variances of note. Accordingly, a "starting reliability cyclic duty" page is not shown in the drawings, but rather the variances between the a "starting reliability cyclic duty" page and the page 160 are described below.

The creation of the FW graph in the upper left corner of the a "starting reliability cyclic duty" page is unchanged, as compared with the page 160, with the note that only CYCLIC DUTY units are used in the fleet roll-up. Planed outages need to be removed from the roll up of this data as well.

Further, the creation of the table in the lower left corner of the "starting reliability cyclic duty" page is unchanged with the exception of the following fields:

Turbines in Fleet: Only the number of CYCLIC DUTY units are reported;

Turbine Days: The value is the number of turbine days used in the roll up. The impact of forced outages needs to be included; and Unusable Turbine Days: From the population of Turbine Days as described above, the Unusable Turbine Days are those that fail the quality checks.

Further, in the Weeks from COD graph in the upper right corner of the a "starting reliability cyclic duty" page is plotted using the STARTING RELIABILITY CYCLIC DUTY data calculated from the processing described in conjunction with FIG. 7 above. It should be appreciated that the system and method of the invention may utilize any suitable manipulation, processing or calculation of the obtained data, as is desired.

The selection of the "starting reliability peak duty" tab 114 by a user results in the system generating a "starting reliability peak duty" page. This "starting reliability peak duty" page substantially corresponds in appearance to the page 160, but with several variances of note. Accordingly, a "starting reliability peak duty" page is not shown in the drawings, but rather the variances between the a "starting reliability peak duty" page and the page 160 are described below. The creation of the FW graph in the upper left corner of the a "starting reliability peak duty" page is unchanged, as compared with the page 160, with the exception that only PEAK DUTY units are used in the fleet roll-up. Planed outages need to be removed from the roll up of this data as well.

Further, the creation of the table in the lower left corner of the "starting reliability peak duty" page is unchanged with the exception of the following fields:

Turbines in Fleet: Only the number of PEAK DUTY units are reported;

Turbine Days: The value is the number of turbine days used in the roll up. The impact of forced outages needs to be included; and Unusable Turbine Days: From the population of Turbine Days as described above, the Unusable Turbine Days are those that fail the quality checks.

Further, in the Weeks from COD graph in the upper right corner of the a "starting reliability peak duty" page is plotted using the STARTING RELIABILITY PEAK DUTY data calculated from the processing described in conjunction with FIG. 7 above. It should be appreciated that the system and method of the invention may utilize any suitable manipulation, processing or calculation of the obtained data, as is desired.

In accordance with one embodiment of the invention as described above and shown in FIG. 2, the home page 100 includes a link to the "tag quality metrics." The information available under this link includes statistics produced by the control system 20 as the quality of the incoming raw data is assessed for its suitability in creating secondary information. The system 20 calculates the secondary information under all conditions, i.e., based on what the end user, monitoring entity or other person or entity might desire. That is, one end user might, for some reason, want access to data that another end user would not want due to inaccuracy concerns.

Once the control system 20 calculates the secondary information, for example this might be done by data quality subroutines in the control portion 27, then the control system 20 assesses the suitability of the raw data as well as the secondary information. Quality scores are calculated for each piece of secondary information based on the raw data and the secondary information. Where any quality score falls below a customer defined threshold, the secondary information is not transmitted to the customer in accordance with one embodiment of the invention. This is done to prevent poor quality data from being converted into poor quality secondary information and then mingled with usable secondary information. By calculating and storing all secondary information and a data quality score, if customers ever desire to change their threshold of good and bad data, which may be done as desired, the information is available without recalculation. It should further be noted that any data quality standard, such as thresholds or other criteria, may be used to practice the invention.

It should further be understood that any of a variety of information might be used to assist in the processing of operation data from a turbine. For example, at the time of purchase of the turbine, the purchaser might convey the intended us of the turbine. This information might be used to perform more effective processing of operation data obtained from that turbine.

Figure 8:
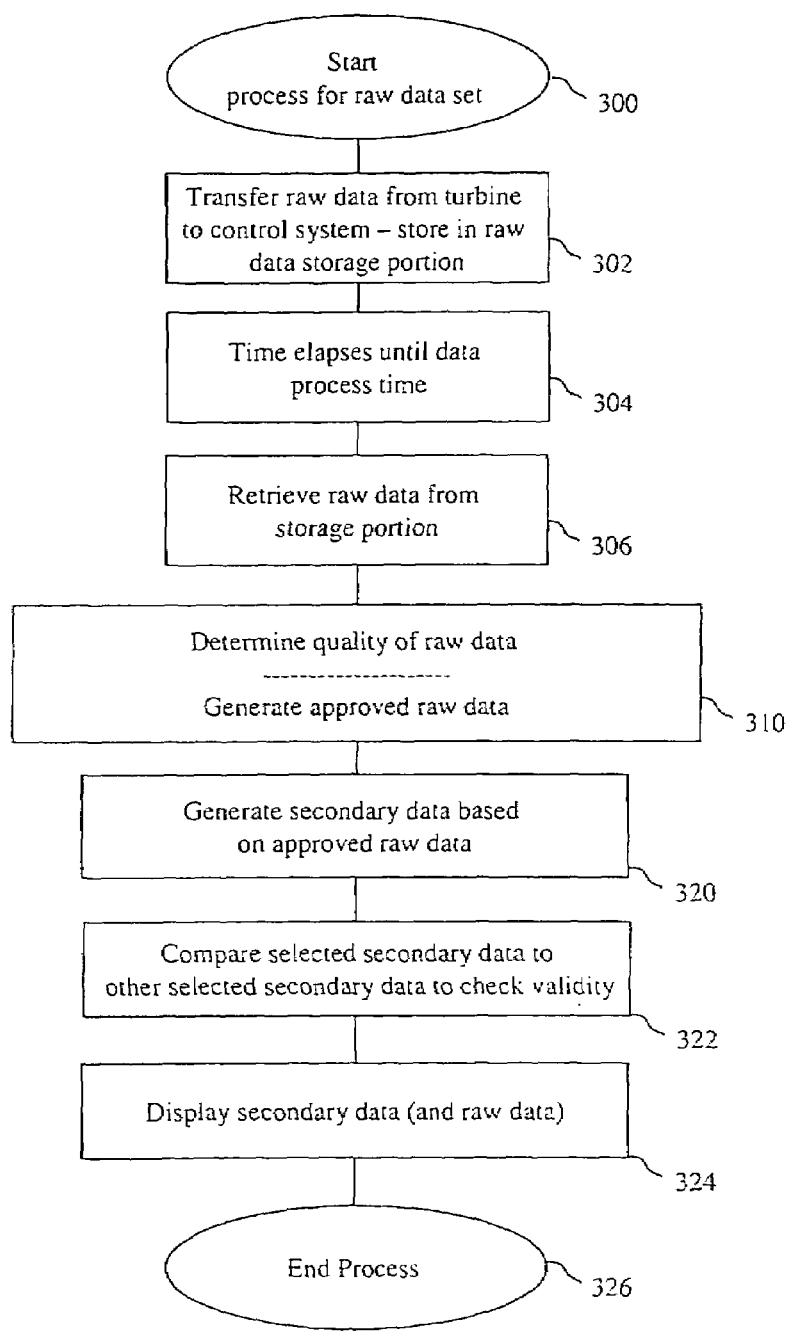
FIG. 8 is a flow chart showing a process for a raw data set in accordance with one embodiment of the invention.
Figure 9:
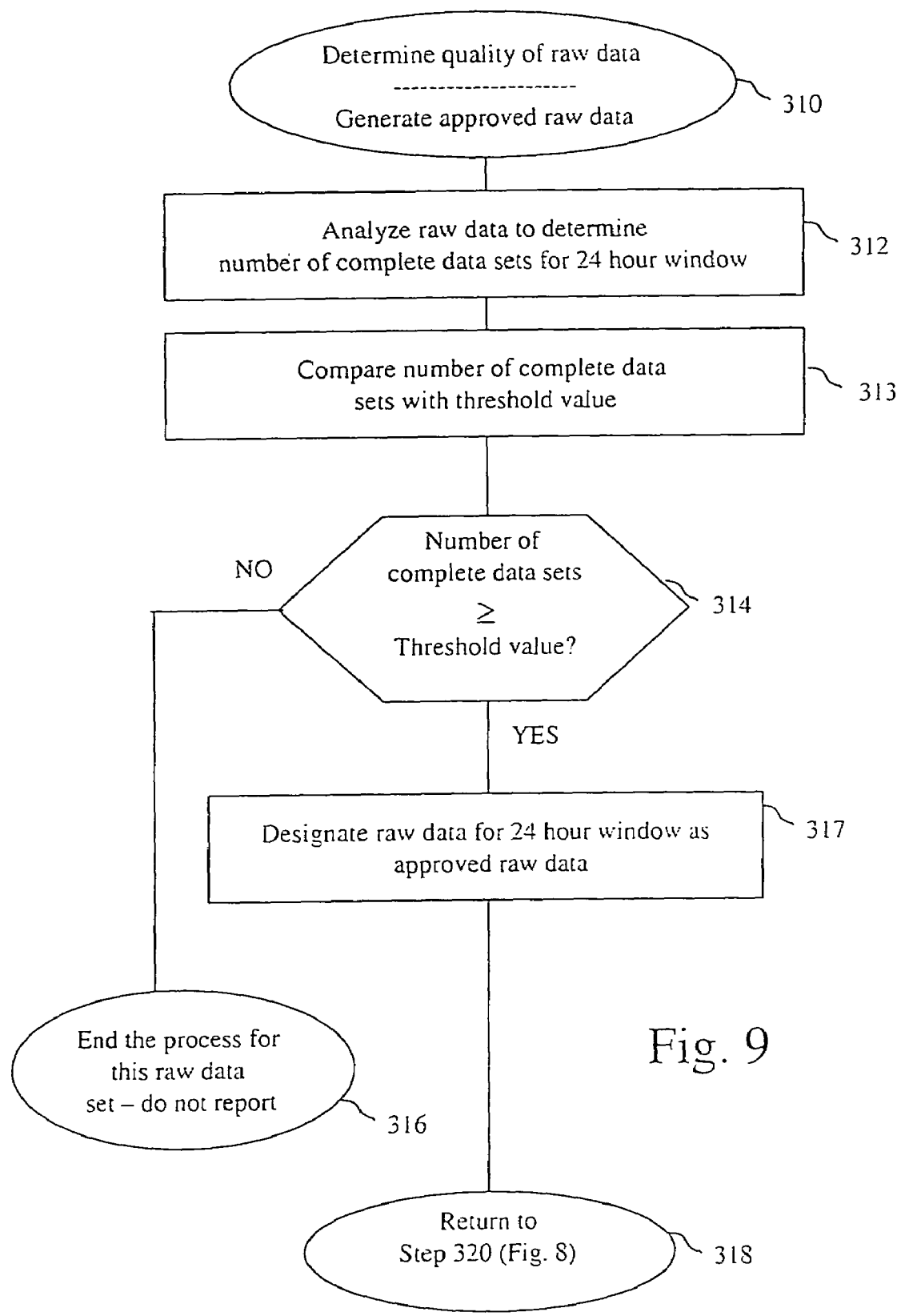
FIG. 9 is a flow chart showing the step of "determine quality of raw data—generate approved raw data" in further detail in accordance with one embodiment of the invention.

In accordance with one embodiment of the invention, FIGS. 8 and 9 are flowcharts showing the process of the invention. The process as shown in FIGS. 8 and 9 might be performed by the control system 20, or by another suitable system. As shown in FIG. 8, the process starts in step 300. Then, in step 302, the process transfers the raw data from a turbine to the control system 20, for example. This raw data might then be stored in the raw data storage portion 26. In step 304, a period of time is then allowed to elapse, i.e., such as a day or a week. Then the process passes to step 306 in which the raw data is retrieved from the raw data storage portion by the data processor/calculation portion 23, for example.

The data processor/calculation portion 23 then, in step 310, determines the quality of the raw data, and as a result, generates approved raw data. Further aspects of step 310 are described with reference to FIG. 9 below.

After step 310, the process passes to step 320. In step 320, the data processor/calculation portion 23 processes the approved raw data in order to generate secondary data. This processing and the calculations associated therewith may be done in any suitable manner. Once the secondary data is generated, selected secondary data may be compared to other selected secondary data. This comparison is done to check validity. For example, secondary data relating to the speed of rotation of a turbine might be checked with secondary data relating to the power generated by the same turbine, i.e., since one might expect the two secondary data items to correspond to some extent. It should be appreciated that any secondary data may be calculated as desired, and that the invention is not limited to service factor or starting reliability parameters. Accordingly, other methods of measuring service factor or starting reliability parameters might be used, i.e., other than those described above.

After step 322, the process passes to step 324. In step 324, the secondary data is displayed in the form of a report. Further, the raw data may also be displayed, in the form of a report, as is desired. It should be appreciated that the data may be displayed in any suitable manner. For example, the data may be displayed on a web page for use by an end user or a customer, the data may be printed and forwarded in some manner, or the data may be otherwise forwarded over the Internet. Further, the format and content of the displayed data may be as desired. As used herein, a report is any collection of information, which may be illustratively in electronic or physical form, that is useful to an entity or person, for example.

After, the data is displayed, any of a variety of further actions might be taken as desired. For example, if a monitoring entity knows that an end user should be producing power, and they are not, then the monitoring entity might contact the end user to determine the problem.

Further, it should be appreciated that the operations of the control system 20 and/or the process of FIGS. 8 and 9, for example, may be fully automated. Accordingly, the system and method of the invention provide, in accordance with one embodiment of the invention, an automated system to apply data quality standards against the input data to prevent inaccurate secondary information from being reported.

As shown in FIG. 8, after step 324, the processes passes to step 326. In step 326, the process ends.

FIG. 9 is a flowchart showing in further detail the "determine quality of raw data—generate approved raw data step" of FIG. 8. As shown in FIG. 9, the process starts in step 310 and passes to step 312. In step 312, the raw data is analyzed in accordance with one embodiment of the invention. In this embodiment, a controller of a turbine is programmed to write data once a minute. This data is then conveyed to the control system 20 and stored in the raw data storage portion 26, as described above. Since there are 1440 minutes in a day, the most data sets would be 1440. The process of FIG. 9 first determines how many complete, i.e., usable data sets have been received in a given 24 hour window.

After step 312, the process passes to step 313 in which the process compares the number of complete data sets, that were determined, with a threshold value. For example, the threshold value might be 1368, i.e., such that 95% of the data is required to meet the threshold. It should be appreciated that this threshold value, as well as the other threshold values described herein may be adjusted as desired. For example, as a customer's need for accuracy increases, the threshold values might be increased.

After step 313, the process passes to step 314. In step 314, the process determines whether the number of complete data sets is greater than the threshold. If not, then the process passes to step 316. In step 316, the process for this particular data set is ended, and as a result, the raw data nor any secondary results from the raw data are reported. Alternatively, such raw and secondary data might be reported, but with some disclaimer regarding the deficiency in the raw data utilized.

Alternatively, in step 314, the process may determine that the number of complete data sets is greater than the threshold. As a result, the process passes to step 317. In step 317, the raw data for the 24 window is designated as approved raw data, and thus suitable for reporting.

After step 317, the process passes to step 318. In step 318, the process returns to step 320, as proceeds using the approved raw data, as described above.

Accordingly, the system and method of the invention provide for inputting operational data, which may be raw data for example, from a turbine, checking the validity of that data, and generating secondary data based on the input raw data. The various secondary data may be checked against each other. It should thus be appreciated that the various data may be manipulated, compared in any of a wide variety of manners, and displayed so as to address the needs of a particular person or entity. In order to control, and make changes to, the processing of the various data and the display of the data, for example, the control system 20 may be controlled in any suitable manner as is desired. For example, the data presentation portion 30, as shown in FIG. 1, might be provided with the capability to adjust the processing of data and the manner in which the data is displayed.

As described herein, the system and method of the invention may utilize any suitable application program, a collection of separate application programs, a module of a program that is designed to handle, or a portion of a module of a program, for example to perform the various processing as described herein. It should be appreciated that the computer language used in the system and method of the invention may be any of a wide variety of programming languages. Further, it is not necessary that a single programming language be utilized in conjunction with the operation of the system and method of the invention. Rather, any number of different programming languages may be utilized as is necessary or desirable.

As described above, the system and method of the invention utilize a data presentation portion that provides a user interface. As used in various embodiments of the invention, the user interface may be in the form of, but is not limited to, any software, hardware or combination of hardware and software used in an operating system that allows a user to interact with the operating system. Thus, a user interface may include any of a display screen, touch screen, keyboard, mouse, voice reader, voice recognizer, dialogue screen, menu box, a list, a checkbox, a toggle switch, a pushbutton or any other object that allows a user to receive information regarding the operation of the program and/or provide the operating system with information. Accordingly, the user interface is any device that provides communication between a user and a computer. The information provided by the user to the computer through the user interface may be in the form of a command, a selection or data, or other input, for example.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure, which includes the attachments, is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method for monitoring the operation of a plurality of turbines in respective operating locations, the method comprising the steps of:

inputting operation data from each of the turbines;

processing the operation data to generate secondary operation data; and generating at least one report based on the secondary operation data;

wherein the step of processing the operation data to generate secondary operation data includes applying data quality standards against the operation data; and wherein the step of applying data quality standards against the operation data results in operation data, which satisfied the data quality standards, being designated as approved operation data.

2. The method of claim 1, wherein the step of generating at least one report based on the secondary operation data includes displaying reports based only on the approved operation data, and not operation data that was not approved, such that inaccurate secondary operation data is not included in the report.

3. The method of claim 2, wherein the steps of inputting operation data from each of the turbines, processing the operation data to generate secondary operation data, and generating at least one report based on the secondary operation data are automated.

4. A method for monitoring the operation of a plurality of turbines in respective operating locations, the method comprising the steps of:

inputting operation data from each of the turbines;

processing the operation data to generate secondary operation data; and generating at least one report based on the secondary operation data;

wherein the step of processing the operation data to generate secondary operation data includes applying data quality standards against the operation data; and wherein applying data quality standards against the operation data includes:

defining a window of time for analysis of the operation data;

determining the number of complete data sets received in the window of time; and comparing the number of complete data sets received in the window of time with a threshold value, the threshold value designating the number of complete data sets that should have been received in the window of time.

5. The method of claim 4, wherein, if the number of complete data sets received in the window of time is less than the threshold value, which designates the number of complete data sets that should have been received in the window of time, then such operation data is not processed to generate secondary operation data.

6. The method of claim 4, wherein if the number of complete data sets received in the window of dine with a threshold value is less than the threshold value, designating the number of complete data sets that should have been received in the window of time, then such operation data is processed to generate secondary operation data;

the method further including the step of including an indicator with the generated secondary data reflecting the threshold value comparison.

7. The method of claim 1, wherein the operation data is raw data from each of the turbines.

8. The method of claim 7, wherein sensors are located on each of the turbines, the sensors outputting the operation data.

9. The method according to claim 1, wherein the inputting the operation data from each of the turbines includes transmitting the operation data from the turbine to a monitoring entity.

10. The method according to claim 1, wherein the operation data includes run rime of the turbine.

11. The method of claim 10, wherein the run time of the turbine is determined by sensing when the turbine is above a threshold value.

12. The method of claim 1, wherein the operation data is saved in a data storage portion prior to the step of processing the operation data to generate secondary operation data.

13. The method of claim 1, wherein the step of generating at least one report based on the secondary data includes presenting reports on a web page accessible by the Internet.

14. The method of claim 1, wherein the step of generating at least one report based on the secondary data includes presenting reports in a printed format.

15. The method of claim 1, wherein the operation data includes at least one of power output, turbine rotational speed, and turbine load attributes.

16. The method of claim 1, wherein the secondary operation data includes at least one of service factor and starting reliability.

17. The method of claim 1, wherein the step of generating at least one report based on the secondary operation data includes categorizing the plurality of turbines into duty classifications.

18. The method of claim 1, further including the step of determining a duty status of at least one of the turbines based on the operation data;

the step of generating at least one report including displaying the duty status with the secondary operation data.

19. A system for monitoring the operation of a plurality of turbines in respective operating locations, the system comprising:

a data acquisition portion that inputs operation data from each of the turbines;

a data processor/calculation portion that processes the operation data to generate secondary operation data; and a data presentation portion that generates at least one report based on the secondary operation data;

wherein the data processor/calculation portion applies data quality standards against the operation data; and wherein the data processor/calculation portion defines a window of time for analysis of the operation data;

determines the number of complete data sets received in the window of time; and compares the number of complete data sets received in the window of time with a threshold value the threshold value designating the number of complete data sets that should have been received in the window of time.

20. The system of claim 19, wherein if the number of complete data sets received in the window of time with a threshold value is less than the threshold value, the number of complete data sets that should have been received in the window of time, then the data calculation/calculation portion does not process such operation data to generate secondary operation data.

21. The system of claim 19, wherein the data presentation portion that generates at least one report based on the secondary operation data uses a web page accessible by the Internet.

22. A method for monitoring the operation of a plurality of turbines in respective operating locations, the method comprising the steps of:

inputting operation data from each of the turbines including transmitting the operation data from the turbine to a monitoring entity;

processing the operation data, at the monitoring entity, to generate secondary operation data including applying data quality standards against the operation data; and generating at least one report based on the secondary operation data, the report transmitted over the internet;

wherein the steps of inputting operation data from each of the turbines, processing the operation data to generate secondary operation data, and generating at least one report based on the secondary operation data are automated;

wherein the step of applying data quality standards against the operation data results in operation data, which satisfied the data quality standards being designated as approved operation data, and wherein the step of generating at least one report based on the secondary operation data includes displaying reports based only on the approved operation data and not operation data that was not approved, such that inaccurate secondary operation data is not included in the report.

* * * * *